(12) United States Patent
Yamada

(10) Patent No.: US 6,973,378 B2
(45) Date of Patent: Dec. 6, 2005

(54) IN-VEHICLE CONTROL DEVICE COMMUNICATABLE WITH EXTERNAL COMMUNICATION SYSTEM AND IN-VEHICLE LAN

(75) Inventor: Kazunao Yamada, Kariya (JP)

(73) Assignee: DENSO Corporation, Kariya (JP)

( * ) Notice: Subject to any disclaimer, the term of this patent is extended or adjusted under 35 U.S.C. 154(b) by 72 days.

(21) Appl. No.: 10/782,303

(22) Filed: Feb. 19, 2004

(65) Prior Publication Data

US 2004/0167690 A1    Aug. 26, 2004

(30) Foreign Application Priority Data

Feb. 20, 2003 (JP) .............................. 2003-042530

(51) Int. Cl.[7] .......................................... G06F 19/00
(52) U.S. Cl. .............................. 701/48; 701/1; 701/36
(58) Field of Search .............................. 701/1, 33, 36, 701/48; 455/557, 575.9

(56) References Cited

U.S. PATENT DOCUMENTS

| | | | |
|---|---|---|---|
| 5,467,272 A | * | 11/1995 | Yoshida et al. ................. 701/1 |
| 5,809,432 A | | 9/1998 | Yamashita |
| 5,832,397 A | * | 11/1998 | Yoshida et al. ................. 701/29 |
| 5,890,086 A | * | 3/1999 | Wellman et al. ............... 701/50 |
| 6,360,152 B1 | * | 3/2002 | Ishibashi et al. .............. 701/48 |
| 6,501,368 B1 | * | 12/2002 | Wiebe et al. ................. 340/3.1 |

* cited by examiner

*Primary Examiner*—Gary Chin
(74) *Attorney, Agent, or Firm*—Harness, Dickey & Pierce, PLC

(57) ABSTRACT

In an in-vehicle control device, universal functions, which are universal to all of various corresponding communication modules, are concentrated in a control module. Furthermore, nonuniversal functions, which are not universal to all the communication modules, are concentrated in the respective communication modules. A communication module interface is universal to all the various communication modules. Universal functions, which are universal to all of various vehicular I/O modules, are also concentrated in the control module. Nonuniversal functions, which are not universal to all the vehicular I/O modules, are concentrated in the respective vehicular I/O modules. A vehicular I/O module interface is universal to all the various I/O modules.

10 Claims, 8 Drawing Sheets

IN-VEHICLE CONTROL DEVICE COMMUNICATABLE WITH EXTERNAL COMMUNICATION SYSTEM AND IN-VEHICLE LAN

CROSS REFERENCE TO RELATED APPLICATION

This application is based on and incorporates herein by reference Japanese Patent Application No. 2003-42530 filed on Feb. 20, 2003.

BACKGROUND OF THE INVENTION

1. Field of the Invention

The present invention relates to an in-vehicle control device, which communicates with an external communication network and an in-vehicle LAN.

2. Description of Related Art

For example, in Japanese unexamined Patent publication No. 8-186516, a baseband processing unit and a radio communication unit of a cellular phone are separately provided, and the baseband processing unit is universal. Thus, various types of radio communication units are connectable to the single baseband processing unit to allow use of the single cellular phone for various types of communication systems.

When the technique disclosed in Japanese unexamined Patent publication No. 8-186516 (corresponding to U.S. Pat. No. 5,809,432) is applied to an in-vehicle control device, the single in-vehicle control device can be used for various types of communication systems by providing various communication modules, which correspond to various communication systems having different communication methods.

However, in general, different automobile manufactures use different in-vehicle LAN standards, respectively. Thus, it is difficult to use the single in-vehicle control device for the various in-vehicle LANS. As a result, different in-vehicle control devices, each of which has an interface for a corresponding in-vehicle LAN, need to be individually developed and manufactured. This results in an increase in costs and steps for developing and manufacturing the in-vehicle control device.

SUMMARY OF THE INVENTION

The present invention addresses the above disadvantage. Thus, it is an objective of the present invention to provide an in-vehicle control device, which can be used for various communication systems that use different communication methods, respectively, and which can be also used for various in-vehicle LANs that meet different standards, respectively, to minimize costs and steps required to develop and manufacture the in-vehicle control device.

To achieve the objective of the present invention, there is provided an in-vehicle control device for a vehicle. The in-vehicle control device includes a control module, a detachably installed communication module and a detachably installed vehicular I/O module. The control module is modularized to control operation of the entire in-vehicle control device. The detachably installed communication module is detachably connected to the control module through a communication module interface and is modularized to communicate with an external communication network. The detachably installed vehicular I/O module is detachably connected to the control module through a vehicular I/O module interface and is modularized to communicate data with an in-vehicle LAN of the vehicle. The control module includes at least one universal function that is universal to the detachably installed communication module and at least one replaceable communication module. Each replaceable communication module is replaceable with the detachably installed communication module and uses a communication method that is different from a communication method of the detachably installed communication module. The control module further includes at least one universal function that is universal to the detachably installed vehicular I/O module and at least one replaceable vehicular I/O module. Each replaceable vehicular I/O module is replaceable with the detachably installed I/O module and meets an in-vehicle LAN standard that is different from an in-vehicle LAN standard met by the detachably installed vehicular I/O module. The detachably installed communication module has at least one nonuniversal function that is not universal to the detachably installed communication module and the at least one replaceable communication module. The communication module interface is universal to the detachably installed communication module and the at least one replaceable communication module. The detachably installed vehicular I/O module has at least one nonuniversal function that is not universal to the detachably installed vehicular I/O module and the at least one replaceable vehicular I/O module. The vehicular I/O module interface is universal to the detachably installed vehicular I/O module and the at least one replaceable vehicular I/O module.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Figure 1:
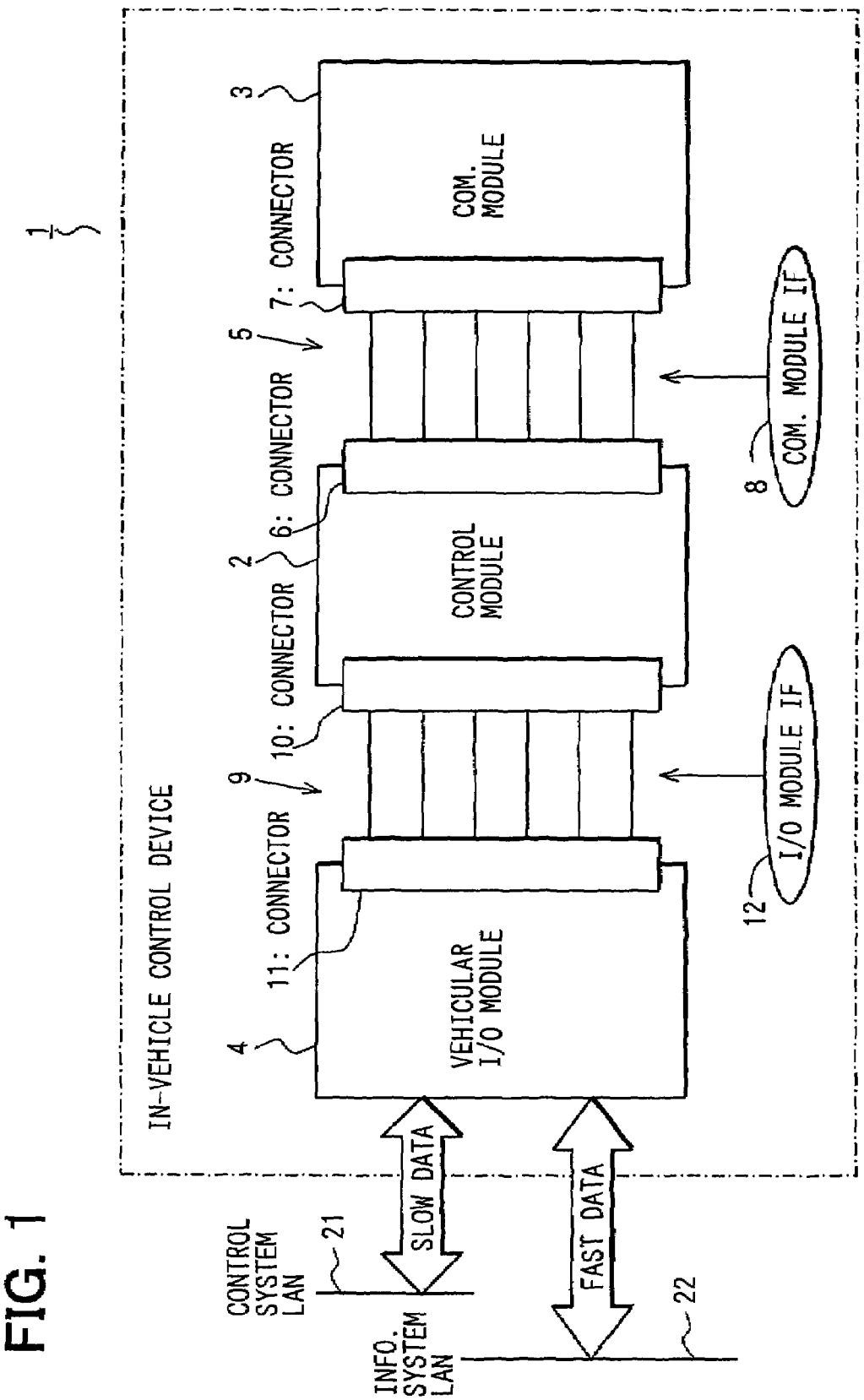
FIG. 1 is a schematic diagram showing an in-vehicle control device according to an embodiment of the present invention.

An embodiment of the present invention will be described with reference to the accompanying drawings. FIG. 1 is a schematic diagram showing a structure of an in-vehicle control device. The in-vehicle control device 1 includes a control module 2, a communication module (detachably installed communication module) 3 and a vehicular I/O module (detachably installed vehicular I/O module) 4. The control module 2 is modularized to control operation of the entire in-vehicle control device 1. The communication module 3 is modularized to communicate with an external communication network. The vehicular I/O module 4 is modularized to communicate data with an in-vehicle LAN of a vehicle.

The control module 2 and the communication module 3 are connected to one another through a communication module connection cable 5, which is connected to a communication module side connector 6 of the control module 2 and also to a control module side connector 7 of the communication module 3. A communication module interface 8, which is arranged between the control module 2 and the communication module 3, is formed by the communication module connection cable 5. Furthermore, the communication module 3 is detachably connected to the control module 2 through the communication module connection cable 5.

The control module 2 and the vehicular I/O module 4 are connected to one another through a vehicular I/O module connection cable 9, which is connected to a vehicular I/O module side connector 10 of the control module 2 and to a control module side connector 11 of the vehicular I/O module 4. A vehicular I/O module interface 12 between the control module 2 and the vehicular I/O module 4 is formed by the vehicular I/O module connection cable 9. Furthermore, the vehicular I/O module 4 is detachably connected to the control module 2 through the vehicular I/O module connection cable 9.

Figure 2:
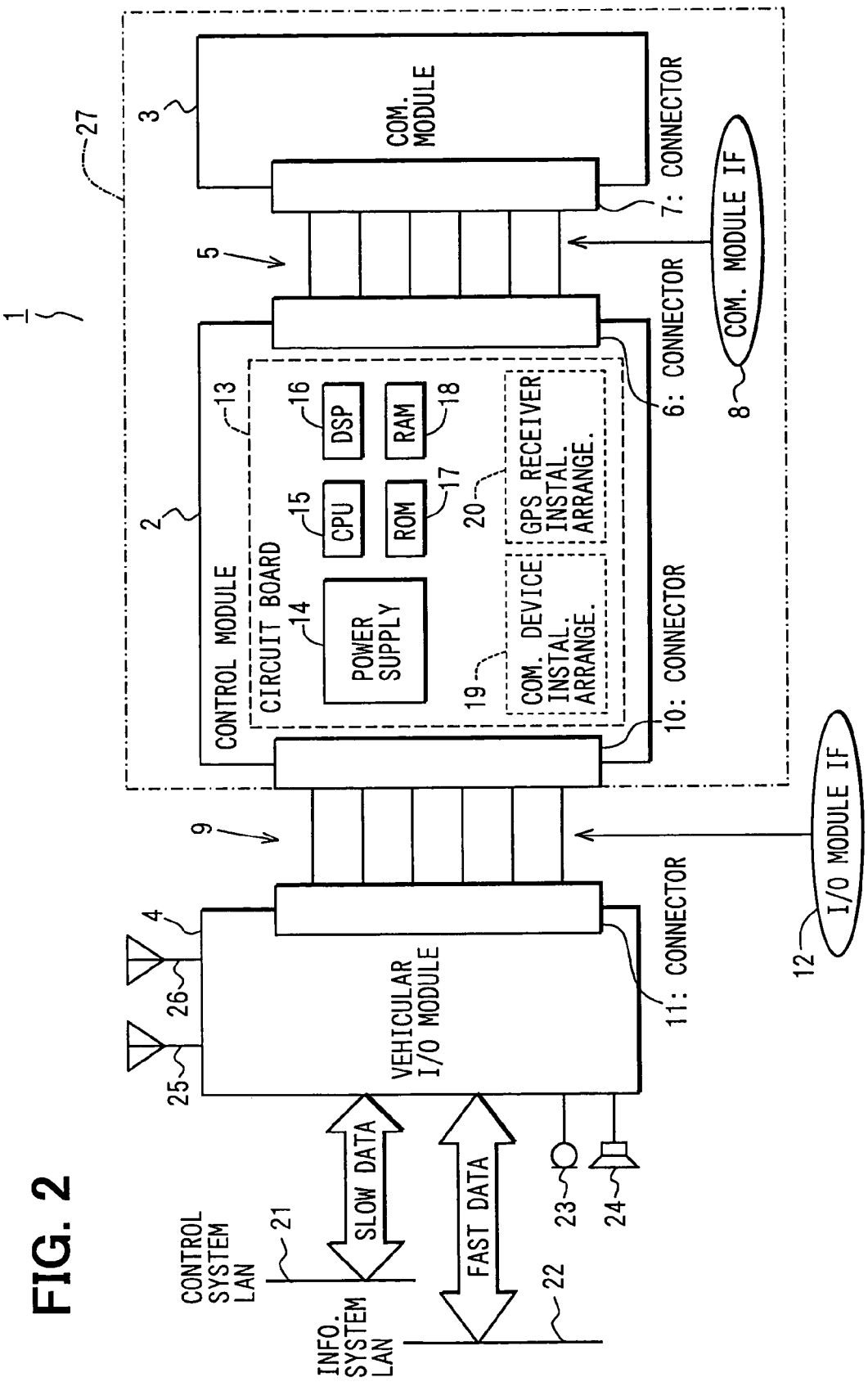
FIG. 2 is a diagram showing a structure of a control module of the embodiment.

As shown in FIG. 2, the control module 2 includes a control module circuit board 13. The control module circuit board 13 includes a power supply device 14, a CPU 15, a DSP 16, a ROM 17, a RAM 18, a Bluetooth (registered trademark) communication device installation arrangement 19 (a radio communication device installation arrangement of the present invention) and a GPS receiver installation arrangement 20. The power supply device 14 supplies electrical power to corresponding components. The CPU 15 controls operation of the entire device. The DSP 16 processes digital signals.

The Bluetooth communication device installation arrangement 19 is a dedicated arrangement, which is provided to install a Bluetooth communication device (not shown), i.e., which is adapted to receive and to operably connect with the Bluetooth communication device. When the Bluetooth communication device is installed to the Bluetooth communication device installation arrangement 19, the Bluetooth communication device is installed to the in-vehicle control device 1. Furthermore, the GPS receiver installation arrangement 20 is a dedicated arrangement, which is provided to install a GPS receiver (not shown), i.e., which is adapted to receive and to operably connect with the GPS receiver. When the GPS receiver is installed to the GPS receiver installation arrangement 20, the GPS receiver is installed to the in-vehicle control device 1. With the above structure, when the Bluetooth communication device and/or the GPS receiver needs to be installed to the in-vehicle control device 1, the Bluetooth communication device and/or the GPS receiver can be effectively installed to the control module circuit board 13 of the in-vehicle control device 1 since the Bluetooth communication device installation arrangement 19 and the GPS receiver installation arrangement 20 are already provided in the control module circuit board 13 in advance. Thus, it is not required to provide a separate control module circuit board, which is separate from the control module circuit board 13.

The vehicular I/O module 4 communicates low speed data (slow data) with a control system LAN 21 installed in the vehicle. Furthermore, the vehicular I/O module 4 communicates high speed data (fast data) with an information system LAN 22 installed in the vehicle. The control system LAN 21 is formed by interconnecting various corresponding devices, such as various ECUs, which are involved in vehicle control operation. The information system LAN 22 is formed by interconnecting various corresponding devices, such as an automobile navigation system and a vehicular display device.

A microphone 23 and a speaker 24 are connected to the vehicular I/O module 4. Furthermore, a telephone antenna 25 and a GPS antenna 26 are also connected to the vehicular I/O module 4. In this instance, when outgoing voice is inputted to the microphone 23, the outgoing voice inputted to the microphone 23 is transferred from the vehicular I/O module 4 to the communication module 3 through the control module 2, and an encoding process and/or a modulation process is performed on the outgoing voice in the communication module 3. Thereafter, the outgoing voice, to which the encoding process and/or the modulation process are performed, is transferred from the communication module 3 to the vehicular I/O module 4 through the control module 2 and is transmitted from the telephone antenna 35 in a form of radio waves.

When incoming voice is captured as radio waves by the telephone antenna 25, the incoming voice captured by the telephone antenna 25 is transferred from the vehicular I/O module 4 to the communication module 3 through the control module 2, and a demodulation process and/or decoding process is performed on the incoming voice. The incoming voice, to which the demodulation process and/or decoding process is performed, is transferred from the communication module 3 to the vehicular I/O module 4 through the control module 2 and is outputted from the speaker 24.

When GPS radio waves, i.e., GPS signals, which are outputted from GPS satellites (not shown), are captured by the GPS antenna 26, the GPS signals captured by the GPS antenna 26 are transferred from the vehicular I/O module 4 to the control module 2. In the case where the GPS receiver is installed to the GPS receiver installation arrangement 20, the received GPS signals are processed by the GPS receiver. The control module 2 and the communication module 3 are received in a single common housing 27 and thus are integrated.

Figure 3:
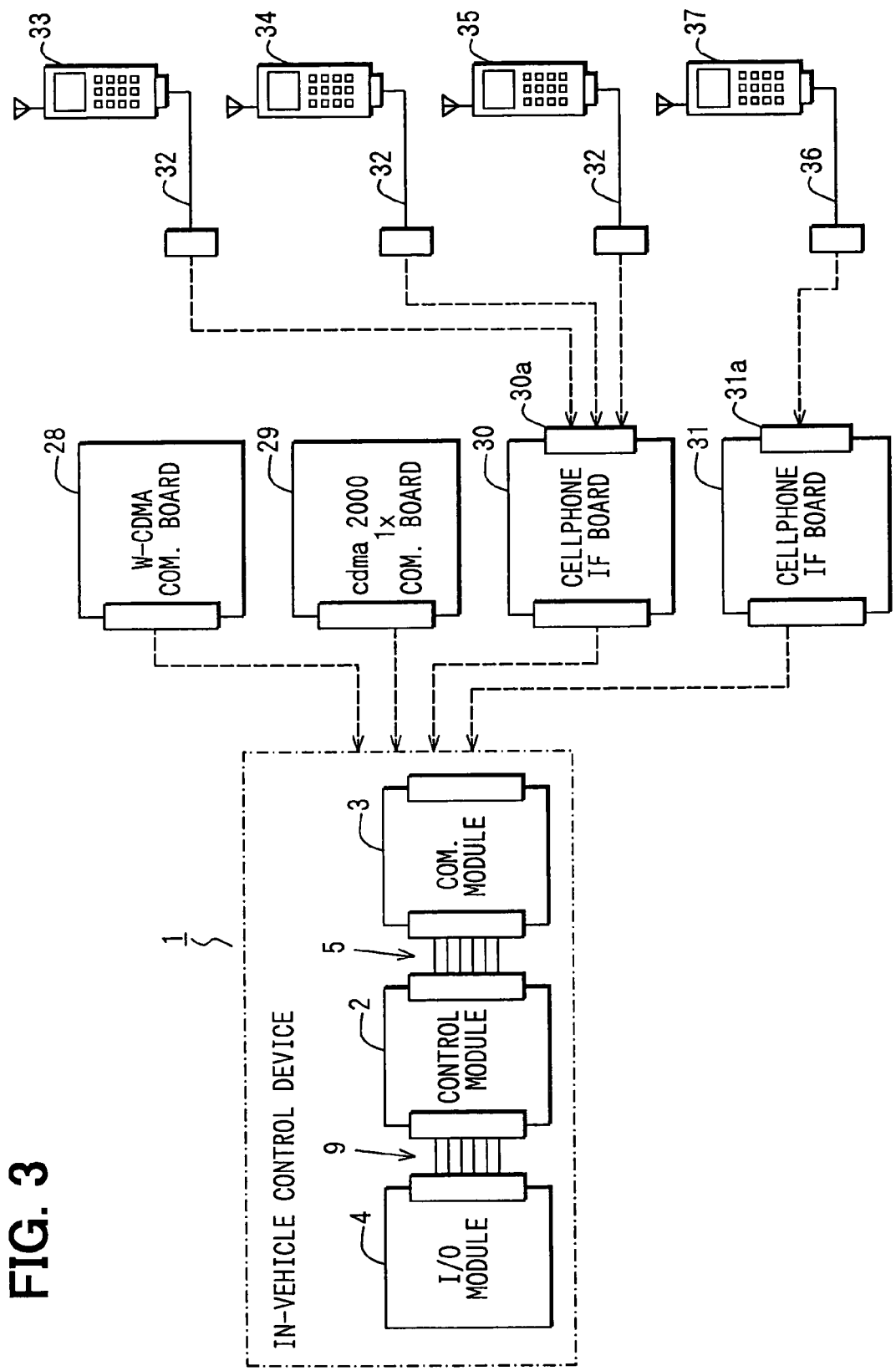
FIG. 3 is a diagram showing various exemplary communication modules of the embodiment.

Next, the communication module 3 will be described with reference to FIGS. 3 and 4. A pin arrangement of the control module side connector 7 of the communication module 3 and commands, i.e., instructions, which are communicated between the control module 2 and the communication module 3 are universal to, i.e., are compatible with various types of communication modules 3, which use different communication methods, respectively.

In this case, the communication module 3, which includes, for example, a W-CDMA communication circuit board 28, a cdma2000 1x communication circuit board 29 or a cellular phone interface communication circuit board 30 or 31, is connected to the control module 2 through the communication module connection cable 5. Here, it should be noted that any of the communication circuit boards 28–31 can be used as the detachably installed communication module of the present invention or can be used as a replaceable communication module of the present invention. The W-CDMA communication circuit board 28 has functions required to perform communications with a W-CDMA communication system. When the W-CDMA communication circuit board 28, which serves as the communication module 3, is connected to the control module 2 through the communication module connection cable 5, the in-vehicle control device 1 can be used for, i.e., is adapted to the W-CDMA communication system.

The cdma2000 1x communication circuit board 29 has functions required to perform communications of the cdma2000 1x communication system. When the cdma2000 1x communication circuit board 29, which serves as the communication module 3, is connected to the control module 2 through the communication module connection cable 5, the in-vehicle control device 1 can be used for, i.e., is adapted to the cdma2000 1x communication system.

The cellular phone interface circuit board 30 includes a connector 30a, to which a cellular phone connection cable 32 is connected. Various types of cellular phones can be operably connected to the cellular phone connection cable 32. When the cellular phone connection cable 32 is connected to the connector 30a, the various types of cellular phones can be connected to the cellular phone interface circuit board 30. Thus, when the cellular phone interface circuit board 30, which serves as the communication module 3, is connected to the control module 2 through the communication module connection cable 5, and a W-CDMA cellular phone 33 is connected to the cellular phone interface circuit board 30 through the cellular phone connection cable 32, the in-vehicle control device 1 can be used for, i.e., is adapted to the W-CDMA communication system.

Furthermore, when the cellular phone interface circuit board 30, which serves as the communication module 3, is connected to the control module 2 through the communication module connection cable 5, and a cdma2000 1x cellular phone 34 is connected to the cellular phone interface circuit board 30 through the cellular phone connection cable 32, the in-vehicle control device 1 can be used for, i.e., is adapted to the cdma2000 1x communication system. Also, when the cellular phone interface circuit board 30, which serves as the communication module 3, is connected to the control module 2 through the communication module connection cable 5, and a PDC cellular phone 35 is connected to the cellular phone interface circuit board 30 through the cellular phone connection cable 32, the in-vehicle control device 1 can be used for, i.e., is adapted to the PDC communication system. In this case, as long as the connector 30a of the cellular phone interface circuit board 30 is exposed from the housing 27 after connection of the cellular phone interface circuit board 30 to the control module 2 through the communication module connection cable 5, a user can easily connect a desired cellular phone to the in-vehicle control device 1.

Furthermore, the cellular phone interface circuit board 31 includes a connector 31a, to which a cellular phone connection cable 36 is connected. Here, the cellular phone connection cable 36 is connectable with a next generation cellular phone 37. When the cellular phone connection cable 36 is connected to the connector 31a, the next generation cellular phone 37 can be connected to the cellular phone interface circuit board 31. Thus, when the cellular phone interface circuit board 31, which serves as the communication module 3, is connected to the control module 2 through the communication module connection cable 5, and the next generation cellular phone 37 is connected to the cellular phone interface circuit board 31 through the cellular phone connection cable 36, the in-vehicle control device 1 can be used for, i.e., is adapted to a next generation communication system. In this case too, as long as a connector 31a of the cellular phone interface circuit board 31 is exposed from the housing 27 after connection of the cellular phone interface circuit board 31 to the control module 2 through the communication module connection cable 5, a user can easily connect a desired next generation cellular phone to the in-vehicle control device 1.

The control module 2 identifies various types of communication modules 3 by the following method. Hereinafter, the method for identifying the communication module 3 by the control module 2 will be described with reference to FIGS. 4A–4C. In this instance, the method for identifying the communication module 3 by the control module 2 can be one of the following three methods.

(1) A method in which an identification information request is notified from the control module 2 to the communication module 3.

(2) A method in which an instruction is notified from the control module 2 to the communication module 3.

(3) A method in which an instruction list request is notified from the control module 2 to the communication module 3.

Each of the above-three methods will be described one by one. In the following description, it is assumed that the communication module 3 includes a CPU 38.

Figure 4A:
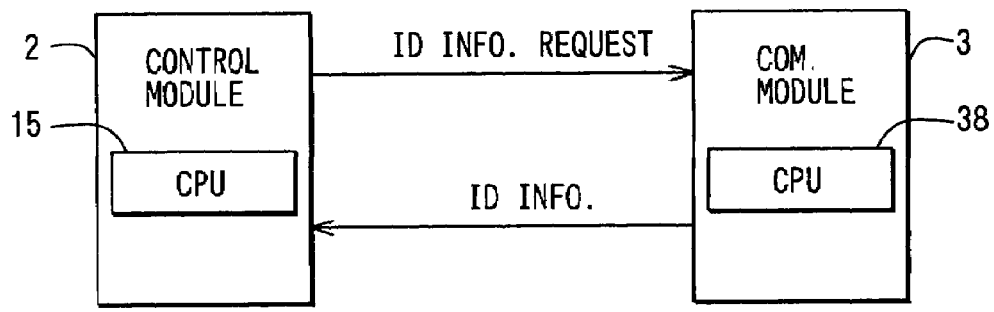
FIG. 4A is a diagram showing a method for identifying the communication module by the control module.

First, "the method in which the identification information request is notified from the control module 2 to the communication module 3" will be described. In this method, as shown in FIG. 4A, the CPU 15 of the control module 2 notifies the identification information request to the communication module 3. When the CPU 38 of the communication module 3 receives the identification information request from the control module 2, the CPU 38 interprets the notified identification information request and then transmits corresponding identification information, which identifies the CPU 38 of the communication module 3, to the control module 2. Thereafter, when the CPU 15 of the control module 2 receives the identification information from the communication module 3, the CPU 15 analyzes the notified identification information and thereby identifies the communication module 3.

Figure 4B:
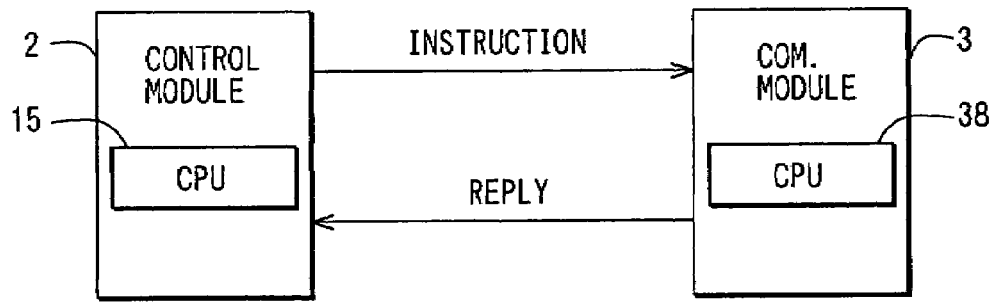
FIG. 4B is a diagram showing another method for identifying the communication module by the control module.

Next, "the method in which the instruction is notified from the control module 2 to the communication module 3" will be described. In this method, as shown in FIG. 4B, the CPU 15 of the control module 2 notifies the instruction to the communication module 3. When the CPU 38 of the communication module 3 receives the instruction from the control module 2, the CPU 38 determines whether it is possible to respond to the notified instruction. When the CPU 38 determines that it is possible to respond to the notified instruction, the CPU 38 transmits a corresponding reply, which corresponds to the instruction, to the control module 2. Then, when the CPU 15 of the control module 2 receives the corresponding reply from the communication module 3, the CPU 15 analyzes the reply and thereby identifies the communication module 3.

Figure 4C:
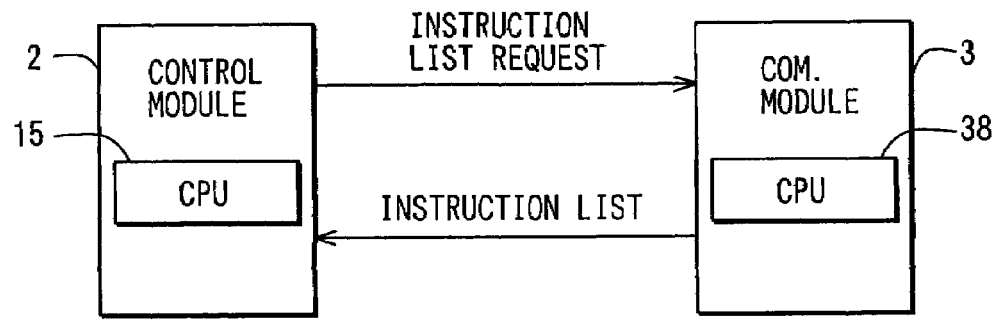
FIG. 4C is a diagram showing another method for identifying the communication module by the control module.
Figure 5:
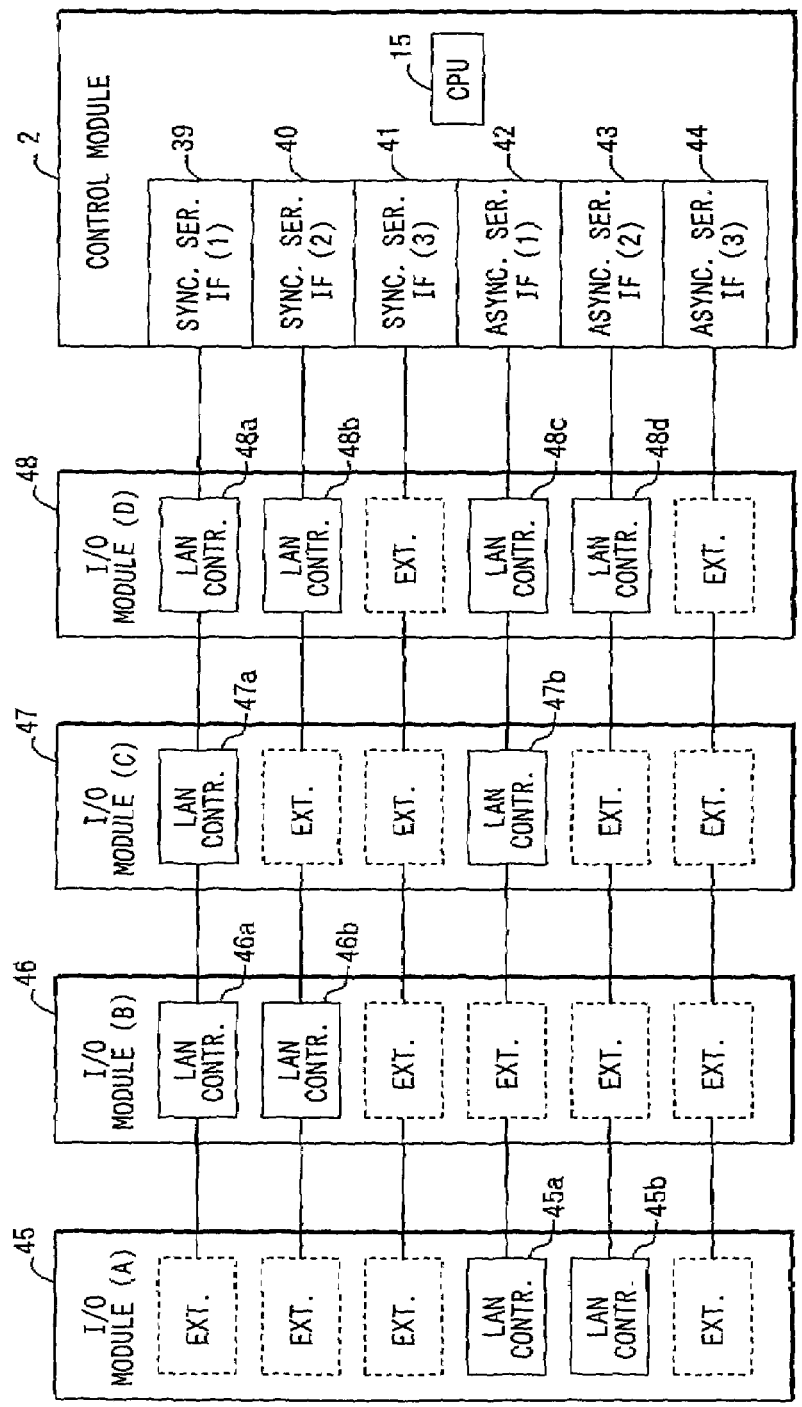
FIG. 5 is a diagram showing various exemplary vehicular I/O modules.

Next, "the method in which the instruction list request is notified from the control module 2 to the communication module 3" will be described. In this method, as shown in FIG. 4C, the CPU 15 of the control module 2 notifies the instruction list request to the communication module 3. When the CPU 38 of the communication module 3 receives the instruction list request from the control module 2, the CPU 38 of the communication module 3 transmits an instruction list, which indicates an instruction(s) executable by the control module 2, to the control module 2. Then, when the CPU 15 of the control module 2 receives the instruction list from the communication module 3, the CPU 15 analyzes the notified instruction list and thereby identifies the communication module 3.

Through any of the above described three methods, the control module 2 can identify the communication module 3.

Next, the vehicular I/O module 4 will be described with reference to FIGS. 5 to 7D. A pin arrangement of the control module side connector 11 of the vehicular I/O module 4 and commands, i.e., instructions, which are communicated between the control module 2 and the vehicular I/O module 4 are universal to, i.e., are compatible with various types of the vehicular I/O modules 4, which meet different in-vehicle LAN standards, respectively.

In this case, each of LAN controllers of the vehicular I/O module 4 is connected to a corresponding one of three synchronous serial interfaces 39–41 and three asynchronous serial interfaces 42–44 of the control module 2.

Specifically, in a case of a vehicular I/O module (A) 45, LAN controllers 45a, 45b of the vehicular I/O module (A) 45 are connected to asynchronous serial interfaces 42, 43, respectively, of the control module 2. In a case of a vehicular I/O module (B) 46, LAN controllers 46a, 46b of the vehicular I/O module (B) 46 are connected to synchronous serial interfaces 39, 40, respectively, of the control module 2. Furthermore, in a case of a vehicular I/O module (C) 47, LAN controllers 47a, 47b of the vehicular I/O module (C) 47 are connected to the synchronous serial interface 39 and the asynchronous serial interface 42, respectively, of the control module 2. Furthermore, in a case of a vehicular I/O module (D) 48, LAN controllers 48a–48d of the vehicular I/O module (D) 48 are connected to the synchronous serial interfaces 39, 40 and the asynchronous serial interfaces 42, 43, respectively, of the control module 2. The control module 2 uses the serial interfaces, to which the LAN controllers are not connected, as extender interfaces (indicated as "EXT." in FIG. 5). Here, it should be noted that any of the vehicular I/O modules 45–48 can be used as the detachably installed vehicular I/O module of the present invention or can be used as a replaceable vehicular I/O module of the present invention.

The control module 2 identifies various types of vehicular I/O modules 4 by the following method. Hereinafter, the method for identifying the vehicular I/O module 4 by the control module 2 will be described with reference to FIGS. 6 and 7. In this instance, the method for identifying the vehicular I/O module 4 by the control module 2 can be one of the following two methods.

(1) A method in which the control module 2 analyzes a combination of signal lines between the control module 2 and the vehicular I/O module 4.

(2) A method in which an identification signal is notified from the control module 2 to the vehicular I/O module 4.

Each of the above two methods will be described one by one.

Figure 6A:
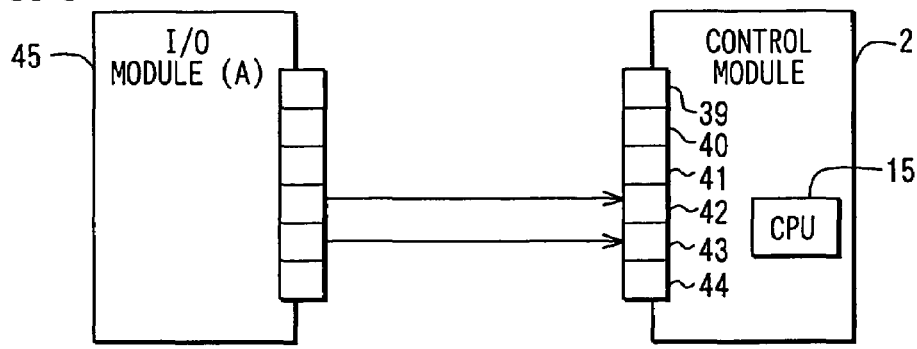
FIG. 6A is a diagram showing a method for identifying the vehicular I/O module by the control module.

First, "the method in which the control module 2 analyzes the combination of signal lines between the control module 2 and the vehicular I/O module 4" will be described. In this method, as shown in FIGS. 6A–6D, the CPU 15 of the control module 2 analyzes the combination of signal lines between the control module 2 and the vehicular I/O module 4 and thereby identifies the vehicular I/O module 4. Specifically, when the vehicular I/O module (A) 45, which serves as the vehicular I/O module 4, is connected to the control module 2, the asynchronous serial interfaces 42, 43 function as the signal lines, as shown in FIG. 6A. Thus, the CPU 15 of the control module 2 detects the asynchronous serial interfaces 42, 43 as the signal lines and thereby identifies the vehicular I/O module (A) 45.

Figure 6B:
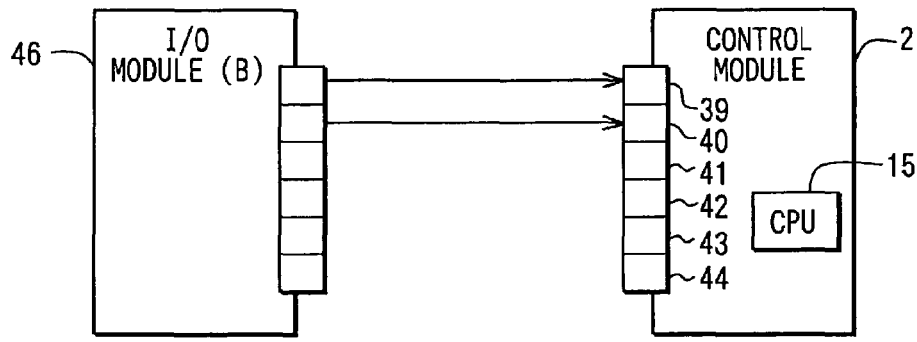
FIG. 6B is a diagram showing another method for identifying the vehicular I/O module by the control module.
Figure 6C:
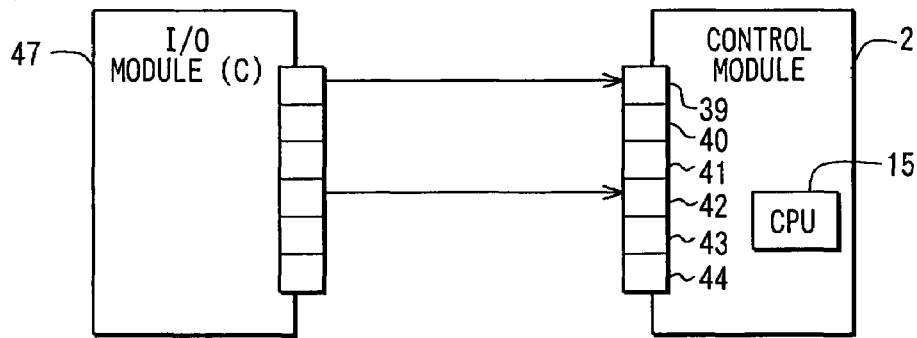
FIG. 6C is a diagram showing another method for identifying the vehicular I/O module by the control module.
Figure 6D:
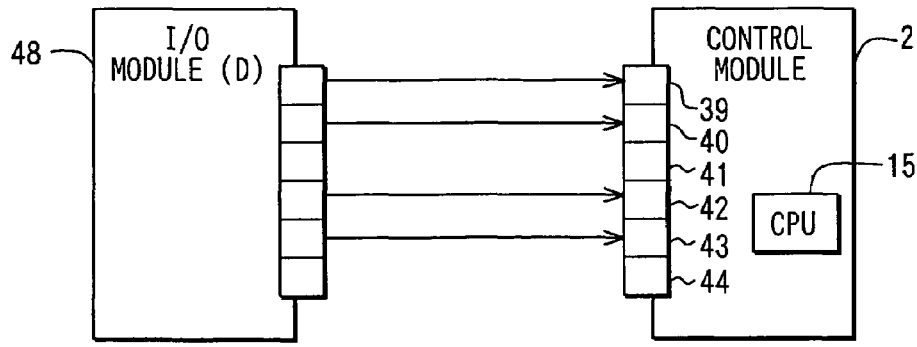
FIG. 6D is a diagram showing another method for identifying the vehicular I/O module by the control module.

Similarly, when the vehicular I/O module (B) 46, which serves as the vehicular I/O module 4, is connected to the control module 2, the synchronous serial interfaces 39, 40 function as the signal lines, as shown in FIG. 6B. Thus, the CPU 15 of the control module 2 detects the synchronous serial interfaces 39, 40 as the signal lines and thereby identifies the vehicular I/O module (B) 46. Furthermore, when the vehicular I/O module (C) 47, which serves as the vehicular I/O module 4, is connected to the control module 2, the synchronous serial interface 39 and the asynchronous serial interface 42 function as the signal lines, as shown in FIG. 6C. Thus, the CPU 15 of the control module 2 detects the synchronous serial interface 39 and the asynchronous serial interface 42 as the signal lines and thereby identifies the vehicular I/O module (C) 47. Also, when the vehicular I/O module (D) 48, which serves as the vehicular I/O module 4, is connected to the control module 2, the synchronous serial interfaces 39, 40 and the asynchronous serial interfaces 42, 43 function as the signal lines, as shown in FIG. 6D. Thus, the CPU 15 of the control module 2 detects the synchronous serial interfaces 39, 40 and the asynchronous serial interfaces 42, 43 as the signal lines and thereby identifies the vehicular I/O module (D) 48.

Next, "the method in which the identification signal is notified from the control module 2 to the vehicular I/O module 4" will be described. In this method, as shown in FIGS. 7A–7D, the CPU 15 of the control module 2 notifies the identification signal to the vehicular I/O module 4 through the asynchronous serial interface 44. When the vehicular I/O module 4 receives the identification signal from the control module 2, the vehicular I/O module 4 transmits a reply from a LAN controller of the vehicular I/O module 4 to the control module 2. Then, when the CPU 15 of the control module 2 receives the reply from the vehicular I/O module 4, the CPU 15 analyzes the combination of signal lines of the connection cable 9, through which the reply is transmitted from the vehicular I/O module 4 to the control module 2, and thereby identifies the vehicular I/O module 4.

Figure 7A:
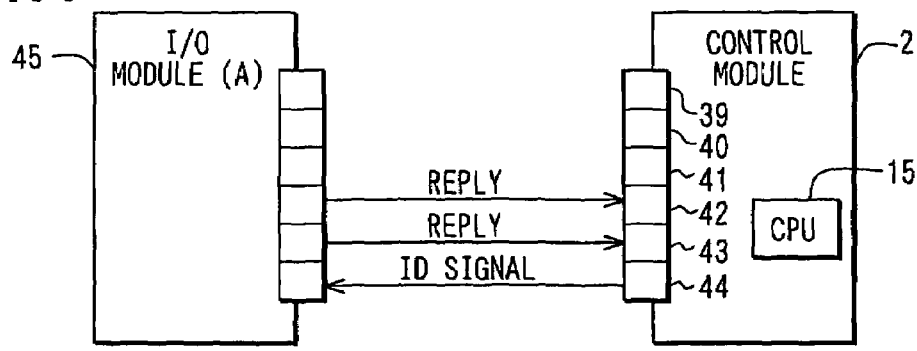
FIG. 7A is a diagram showing a method for identifying the vehicular I/O module by the control module.

More specifically, in the case where the vehicular I/O module (A) 45, which serves as the vehicular I/O module 4, is connected to the control module 2, when the CPU 15 of the control module 2 notifies the identification signal to the vehicular I/O module (A) 45 through the asynchronous serial interface 44, the reply is transmitted from the vehicular I/O module (A) 45 to the control module 2 through the asynchronous serial interfaces 42, 43, as shown in FIG. 7A. Thus, the CPU 15 of the control module 2 detects the transmission of the reply from the vehicular I/O module (A) 45 through the asynchronous serial interfaces 42, 43 and thereby identifies the vehicular I/O module (A) 45.

Figure 7B:
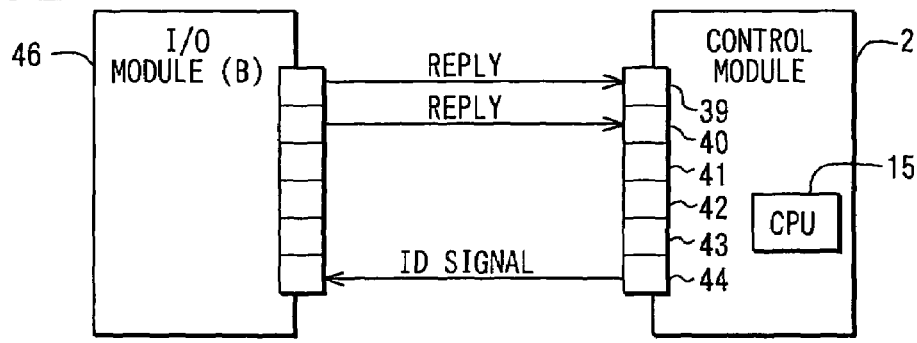
FIG. 7B is a diagram showing another method for identifying the vehicular I/O module by the control module.
Figure 7C:
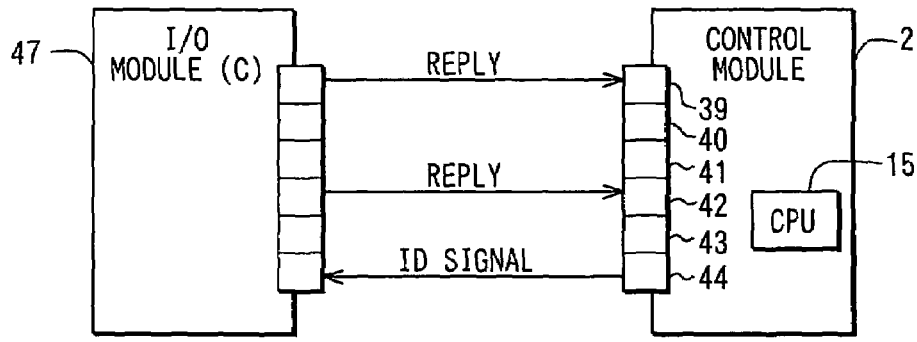
FIG. 7C is a diagram showing another method for identifying the vehicular I/O module by the control module.
Figure 7D:
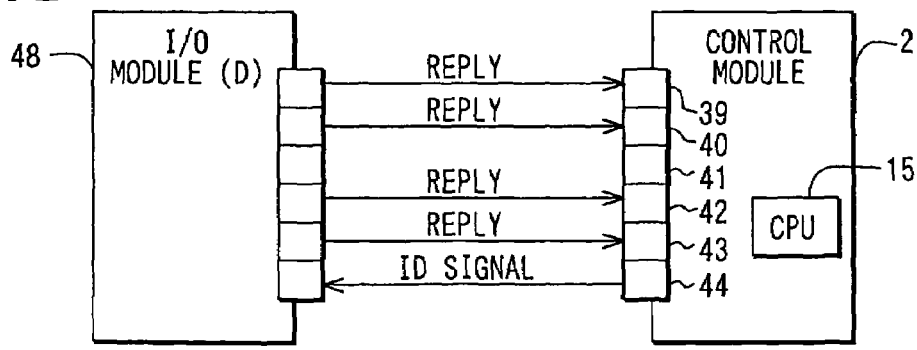
FIG. 7D is a diagram showing another method for identifying the vehicular I/O module by the control module.

Similarly, in the case where the vehicular I/O module (B) 46, which serves as the vehicular I/O module 4, is connected to the control module 2, the CPU 15 of the control module 2 detects the transmission of the reply from the vehicular I/O module (B) 46 through the synchronous serial interfaces 39, 40 and thereby identifies the vehicular I/O module (B) 46, as shown in FIG. 7B. Furthermore, in the case where the vehicular I/O module (C) 47, which serves as the vehicular I/O module 4, is connected to the control module 2, the CPU 15 of the control module 2 detects the transmission of the reply from the vehicular I/o module (C) 47 through the synchronous serial interface 39 and the asynchronous serial interface 42 and thereby identifies the vehicular I/O module (C) 47, as shown in FIG. 7C. Also, in the case where the vehicular I/O module (D) 48, which serves as the vehicular I/O module 4, is connected to the control module 2, the CPU 15 of the control module 2 detects the transmission of the reply from the vehicular I/O module (D) 48 through the synchronous serial interfaces 39, 40 and the asynchronous serial interfaces 42, 43 and thereby identifies the vehicular I/O module (D) 48, as shown in FIG. 7D.

Through any of the above two methods, the control module 2 can identify the vehicular I/O module 4.

Figure 8:
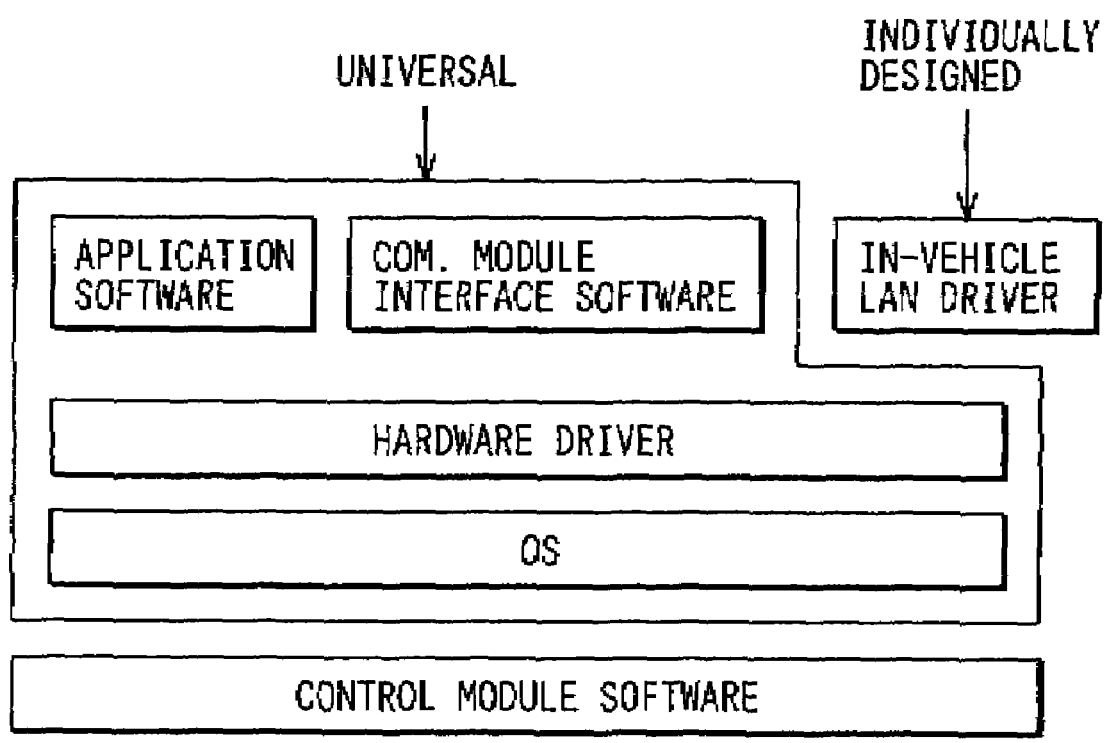
FIG. 8 is a schematic diagram showing control module software arrangement.

FIG. 8 schematically shows control module software arrangement. In this case, an OS, a hardware driver, an application software and a communication module interface software are universally designed, and an in-vehicle LAN driver is individually designed.

In the above instance, the control module 2 includes the CPU 15, and the communication module 3 includes the CPU 38, so that the in-vehicle control device 1 includes the two CPUs 15, 38. However, it should be noted that in place of the two CPUs 15, 38, a CPU, which can control both the control module 2 and communication module 3, can be provided in the control module 2, so that the in-vehicle control device 1 has only one CPU. In such a case, the control module 2 identifies the communication module 3 through a method, which is similar to the method for identifying the vehicular I/O module 4 described above.

As described above, according to the present embodiment, in the in-vehicle control device 1, the universal functions (i.e., compatible functions or common functions), which are universal to, i.e., are common to all the corresponding communication modules 3, which use different communication methods, respectively, are concentrated in the control module 2, and the nonuniversal functions (i.e. non-compatible functions or uncommon functions), which are not universal to, i.e.,. are not common to all the corresponding communication modules 3, are concentrated in the communication modules 3. Furthermore, the communication module interface 8 between the control module 2 and the communication module 3 is universal to the various communication modules 3, and each communication module 3 is detachably connectable to the control module 2. Thus, a desired one of the communication modules 3 can be selected and can be connected to the control module 2, so that the in-vehicle control device 1 can be adapted to the various communication systems.

Furthermore, the universal functions (i.e., compatible functions or common functions), which are universal to, i.e., are common to all the corresponding vehicular I/O modules 4, which meet different in-vehicle LAN standards, respectively, are concentrated in the control module 2, and the nonuniversal functions (i.e. non-compatible or uncommon functions), which are not universal to, i.e., are not common to all the corresponding vehicular I/O modules 4, are concentrated in the vehicular I/O modules 4. Also, the vehicular I/O module interface 12 between the control module 2 and the vehicular I/O module 4 is universal to the various vehicular I/O modules 4, and each vehicular I/O module 4 is detachably connectable to the control module 2. Thus, a desired one of the vehicular I/O modules 4 can be selected and can be connected to the control module 2, so that the in-vehicle control device 1 can be adapted to meet the various vehicular standards.

Specifically, a manufacture, which develops and manufactures the in-vehicle control device 1, develops and manufactures the control module 2 that has the common functions, which are common to the various communication modules 3 and the common functions, which are common to the various vehicular I/O modules 4. Then, the communication module 3, which corresponds to the desired communication system, is connected to the control module 2, and the vehicular I/O module 4, which corresponds to the desired in-vehicle LAN standard, is connected to the control module 2. In this way, the in-vehicle control device 4 of a desired specification can be developed and manufactured. Thus, a portion of the in-vehicle control device 1, which is specific to the desired communication method, can be concentrated in the communication module 3, which is developed and manufacture individually. Furthermore, another portion of the in-vehicle control device 1, which is specific to the desired in-vehicle LAN standard, can be concentrated in the vehicular I/O module 4, which is developed and manufactured individually. Thus, costs and steps required to develop and manufacture the in-vehicle control device 1 can be minimized.

Furthermore, in the above instance, the Bluetooth communication device installation arrangement 19, to which the Bluetooth communication device is installed, and the GPS receiver installation arrangement 20, to which the GPS receiver is installed, are provided in the control module circuit board 13. Thus, even when the Bluetooth communication device and/or the GPS receiver need to be installed to the control module 2, the Bluetooth communication device and/or the GPS receiver can be installed to the control module circuit board 13 without requiring any design modification of the control module circuit board 13. Thus, it is not required to develop and manufacture a new control module to satisfy the need of the Bluetooth communication device and/or the GPS receiver. As a result, the universality of the in-vehicle control device can be improved.

Furthermore, in the above instance, the various cellular phones 33–35, 37, which use different communication methods, respectively, are connectable to the communication module 3. Thus, the various cellular phones 33–35, 37 can be used upon connecting it to the in-vehicle control device 1. Any one of the cellular phones 33–35, 37 can be used while the cellular phone 33–35, 37 is placed outside of the in-vehicle control device 1, thereby improving the convenience of the in-vehicle control device 1.

Also, in the above instance, the control module 2 and the communication module 3 are received in the single housing 27. Thus, in a case where the communication method is already determined, the housing 27, into which the control module 2 and the communication module 3 are integrated, can be provided. In this way, the control module 2 and the communication module 3 can be integrally developed, manufactured and managed. Furthermore, the desired vehicular I/O module 4 can be connected to the housing 27, into which the control module 2 and the communication module 3 are integrated. This allows easy manufacturing of the in-vehicle control device 1.

The present invention is not limited to the above embodiment. The above embodiment can be modified as follows.

In addition to the Bluetooth communication device installation arrangement and/or the GPS receiver installation arrangement, the control module circuit board 13 can have a dedicated wireless LAN communication device installation arrangement, to which a wireless LAN communication device is installed, and/or a dedicated DSRC communication device installation arrangement, to which a DSRC communication device is installed.

Additional advantages and modifications will readily occur to those skilled in the art. The invention in its broader terms is therefore not limited to the specific details, representative apparatus, and illustrative examples shown and described.

What is claimed is:

1. An in-vehicle control device for a vehicle, the in-vehicle control device comprising:
   a control module that is modularized to control operation of the entire in-vehicle control device;
   a detachably installed communication module that is detachably connected to the control module through a communication module interface and is modularized to communicate with an external communication network; and
   a detachably installed vehicular I/O module that is detachably connected to the control module through a vehicular I/O module interface and is modularized to communicate data with an in-vehicle LAN of the vehicle, wherein:
   the control module includes:
      at least one universal function that is universal to the detachably installed communication module and at least one replaceable communication module, wherein each replaceable communication module is replaceable with the detachably installed communication module and uses a communication method that is different from a communication method of the detachably installed communication module; and
      at least one universal function that is universal to the detachably installed vehicular I/O module and at least one replaceable vehicular I/O module, wherein each replaceable vehicular I/O module is replaceable with the detachably installed I/O module and meets an in-vehicle LAN standard that is different from an in-vehicle LAN standard met by the detachably installed vehicular I/O module;
   the detachably installed communication module has at least one nonuniversal function that is not universal to the detachably installed communication module and the at least one replaceable communication module;
   the communication module interface is universal to the detachably installed communication module and the at least one replaceable communication module;
   the detachably installed vehicular I/O module has at least one nonuniversal function that is not universal to the detachably installed vehicular I/O module and the at least one replaceable vehicular I/O module; and
   the vehicular I/O module interface is universal to the detachably installed vehicular I/O module and the at least one replaceable vehicular I/O module.

2. The in-vehicle control device according to claim 1, wherein the control module has a control module circuit board that includes a dedicated radio communication device installation arrangement, which is adapted to receive and to operably connect with a radio communication device.

3. The in-vehicle control device according to claim 1, wherein the control module has a control module circuit board that includes a dedicated GPS receiver installation arrangement, which is adapted to receive and to operably connect with a GPS receiver.

4. The in-vehicle control device according to claim 1, wherein the detachably installed communication module is operably connectable to a plurality of cellular phones, which use different communication methods, respectively.

5. The in-vehicle control device according to claim 1, wherein the control module and the detachably installed communication module are received in a single housing.

6. The in-vehicle control device according to claim 1, wherein:
   the detachably installed communication module transmits identification information, which identifies the detachably installed communication module, to the control module when the detachably installed communication module receives an identification information request from the control module; and
   the control module analyzes the identification information of the detachably installed communication module and thereby identifies the detachably installed communication module when the control module receives the identification information from the detachably installed communication module.

7. The in-vehicle control device according to claim 1, wherein:
   when the detachably installed communication module receives an instruction from the control module, the detachably installed communication module determines whether it is possible to respond to the instruction and transmits a reply to the control module when it is determined that it is possible to respond to the instruction; and
   when the control module receives the reply from the detachably installed communication module, the control module analyzes the reply of the detachably installed communication module and thereby identifies the detachably installed communication module.

8. The in-vehicle control device according to claim 1, wherein:
   when the detachably installed communication module receives an instruction list request from the control module, the detachably installed communication module transmits an instruction list to the control module, wherein the instruction list indicates at least one executable instruction, which is executable by the control module; and
   when the control module receives the instruction list from the detachably installed communication module, the control module analyzes the instruction list received from the detachably installed communication module and thereby identifies the detachably installed communication module.

9. The in-vehicle control device according to claim 1, wherein the control module analyzes a combination of signal lines of the vehicular I/O module interface and thereby identifies the detachably installed vehicular I/O module.

10. The in-vehicle control device according to claim 1, wherein:
    when the detachably installed vehicular I/O module receives an identification signal from the control module, the detachably installed vehicular I/O module transmits a reply to the control module through two or more signal lines of the vehicular I/O module interface; and
    when the control module receives the reply from the detachably installed vehicular I/O module, the control module analyzes a combination of the signal lines of the vehicular I/O module interface, thorough which the reply is transmitted from the detachably installed vehicular I/O module, and thereby identifies the detachably installed vehicular I/O module.

* * * * *